Dec. 11, 1962 F. A. LYON ET AL 3,067,871
SORTING MEANS
Filed Aug. 5, 1960 8 Sheets-Sheet 1
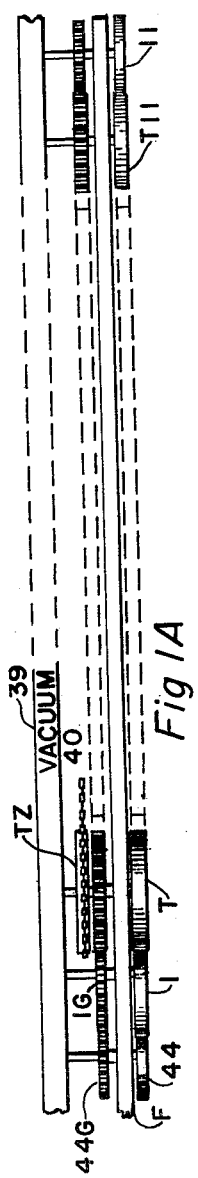
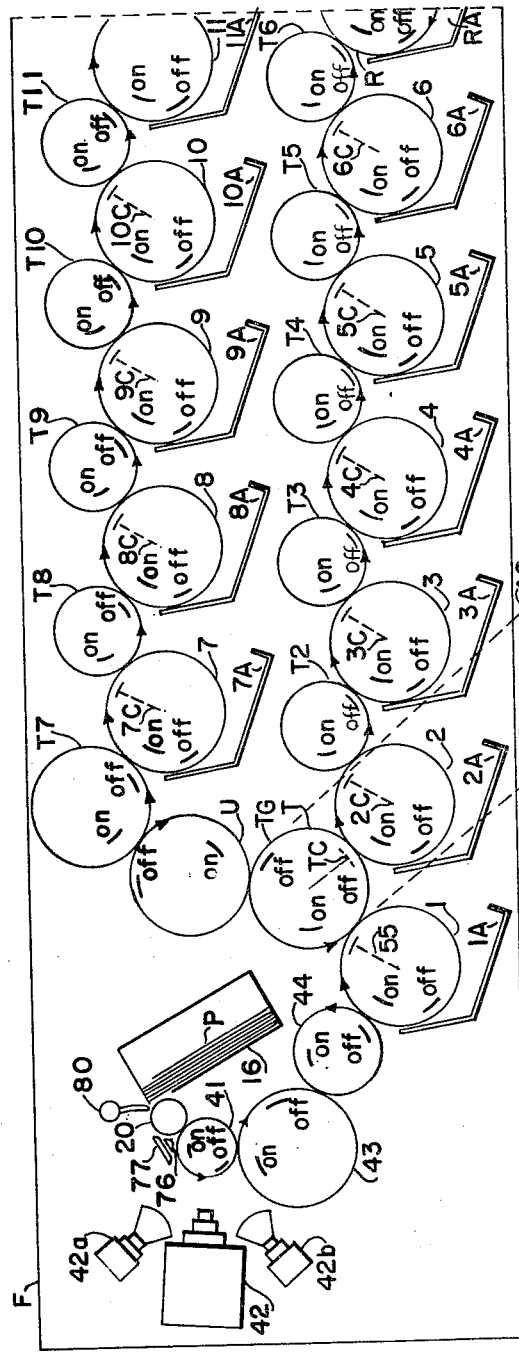
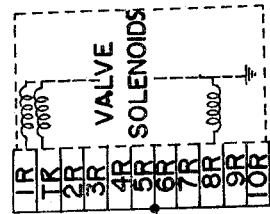
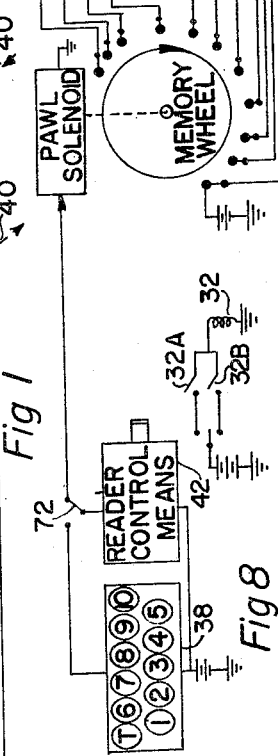
INVENTORS
FLOYD A. LYON
THEODORE F. ARONSON
BY

INVENTORS
FLOYD A. LYON
THEODORE F. ARONSON

Dec. 11, 1962 F. A. LYON ET AL 3,067,871
SORTING MEANS
Filed Aug. 5, 1960 8 Sheets-Sheet 7

INVENTORS
FLOYD A. LYON
THEODORE F. ARONSON
BY

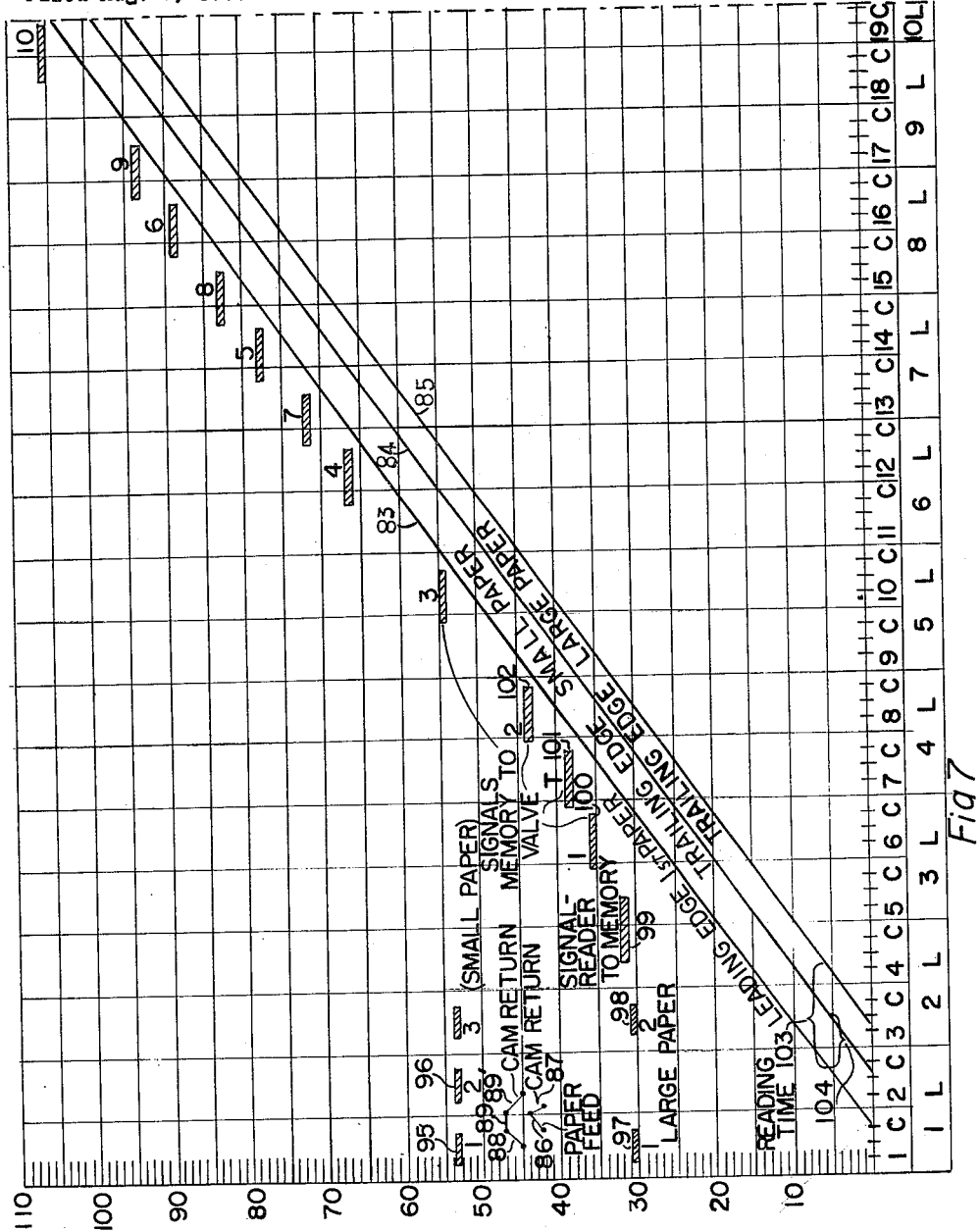

United States Patent Office 3,067,871
Patented Dec. 11, 1962

3,067,871
SORTING MEANS
Floyd A. Lyon, Brookville, and Theodore F. Aronson, Glen Cove, N.Y., assignors to Halm Instrument Co., Inc., Glen Head, N.Y., a corporation of New York
Filed Aug. 5, 1960, Ser. No. 47,858
7 Claims. (Cl. 209—73)

This invention relates to paper sorting means and more particularly to means to sort original documents such as checks, letters, etc. from a stack to a predetermined pocket.

The invention generally comprises means to feed the papers from a stack, control reader means to read a predetermined code on the documents having plurality of vacuum wheels having tangent relationships which are adapted to transport the papers to predetermined pockets. The path of the papers on the vacuum wheels is controlled by means of valves which are operated by signals from the reader control means. Memory means are provided so that a number of papers may be in process at the same time.

Accordingly a principal object of the invention is to provide new and improved paper sorting means.

Another object of the invention is to provide new and improved paper feeding means.

Another object of the invention is to provide new and improved means for sorting and handling original documents such as checks, letters, etc. at high speed and with no danger of tearing.

Another object of the invention is to provide new and improved means for sorting and handling papers with vacuum control.

Another object of the invention is to provide new and improved means for sorting and handling papers without mechanical picks or fingers and without any possibility of jamming or tearing the papers.

Another object of the invention is to control the flow of papers at the paper feeder sucker instantaneously without disturbing the papers in process.

Another object of the invention is to provide paper sorting means comprising means to feed papers from a stack, a first suction wheel adapted to receive single papers from said feeding means, a second suction wheel having a tangent relation to said first suction wheel and adapted to receive said paper therefrom in a series of similarly related wheels and means to control the path of a paper on said wheels in predetermined manner to place said paper in a predetermined pocket.

These and other objects of the invention will be apparent from the following specification and drawings, of which FIG. 1 is a side view of an embodiment of the invention.

FIG. 1A is a top view of FIG. 1.

FIG. 7 is a diagram illustrative of the sequence of operations.

FIG. 8 is a schematic circuit diagram.

Figure 2:
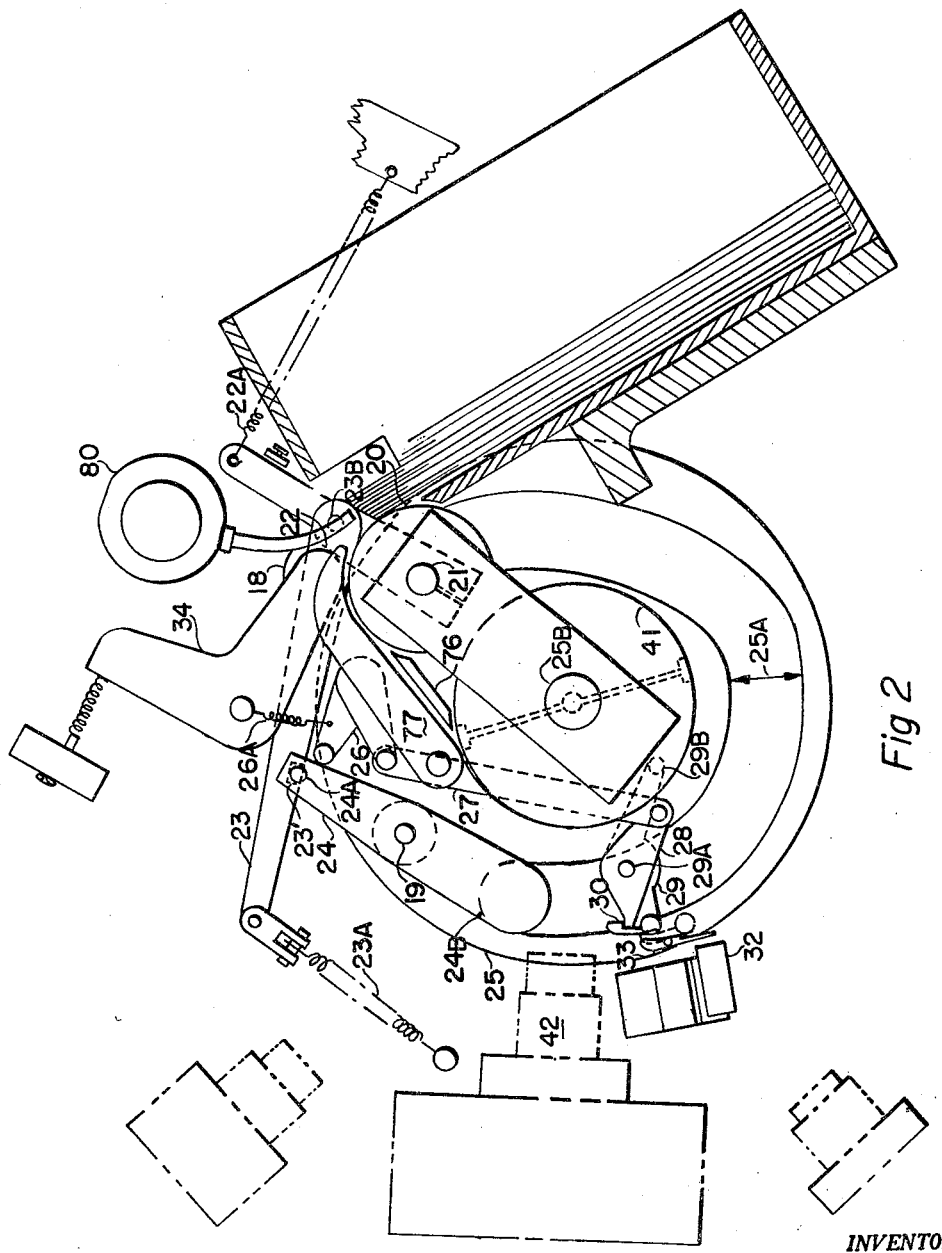
FIG. 2 is an elevation view of the paper feeding means of the invention.

Referring to FIG. 1 the papers P are fed from a rack 16 by means of a vacuum sucker 20 and then transferred to a vacuum wheel 41 which passes in front of a reading device 42 or manual reading station. Reader 42 may be an electronic, photo electric, or magnetic character reader, which are commercially available. The papers are then transferred via vacuum wheels 43 and 44 to a series of vacuum handling wheels or discs tangent each other. The vacuum on the wheels or discs is controlled in response to the reading or manual control to deposit the papers in any one of a number of predetermined pockets 1A to 11A.

The technique generally is to cut off the vacuum on a wheel as it approaches the point of tangency to the next wheel unless it is desired to deposit the paper in the pocket associated with the first wheel. For instance, referring to FIG. 1 all papers are fed via discs 41, 43 and 44 to the disc 1. If the paper is not to be deposited in the pocket 1A then no signal is supplied to the disc 1, its vacuum is automatically cut off, and the paper is automatically transferred to the disc T. However, if it is desired to place that paper in the pocket 1A then the vacuum on the disc 1 is not cut off in response to a signal so that the disc 1 will not transfer the paper to the disc or wheel T, but will retain it and place it in the pocket 1A. If no signal at all is delivered to any of the wheels the paper will be transferred along the bottom line of wheels and be deposited in the reject pocket RA, by wheel R.

If the paper is to be transferred to one of the pockets on the upper level, namely, pockets 7A to 11A then a signal is also supplied to the disc T as well as to the appropriate disc on the upper level. For instance, if the paper is to be deposited in the pocket 8A then a signal is supplied to the discs T and 8 so that the disc T retains the paper, transferring it via discs U and T7, disc 7, disc T8 and disc 8. Since a signal has been supplied to the disc 8 it will retain its vacuum on the paper and will deposit the paper in the pocket 8A.

It is not necessary to supply a signal to disc or wheel 11 as all papers on the upper level will go to pocket 11A if no signal is applied to any of the wheels in the upper level.

Suitable memory means (FIG. 6) are provided so that for instance up to twenty papers may be in process at one time.

Drive is supplied by driven chain 40 to sprocket TZ and gear TG (FIG. 1A) which is the same size as wheel T. Each wheel circle in FIG. 1 represents the drive gears as well as the wheel, so that synchronous drive is transmitted to all wheels. The wheels are synchronized so that the vacuum parts on the wheels will register.

Figure 3:
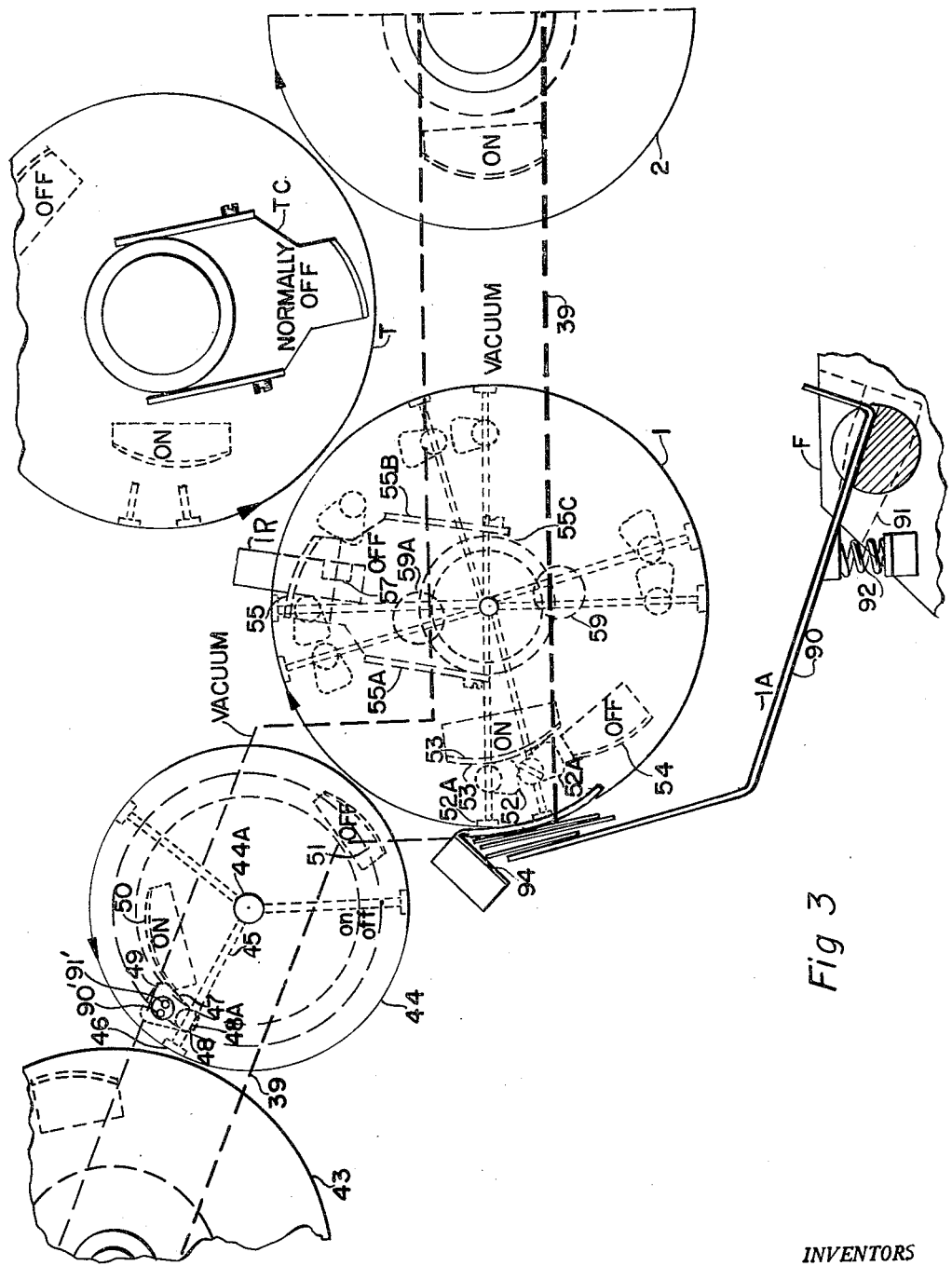
FIG. 3 is a detail view of the vacuum control means on the wheels or discs.

The large wheels may have up to four sets of ports, for carrying up to four small documents at a time, FIG. 3. Each set comprises a pair of closely spaced ports. The three-quarter size wheels like 44 and T2–T11 may have up to three ports or sets of ports.

More specifically referring to FIGS. 1 and 1A the invention comprises a frame F which may comprise front and rear panel members vertically mounted. The rack 16 for the papers is mounted on the front of the frame. The oscillating sucker 20 is pivotally mounted on the frame adjacent one edge of the papers P in the rack 16. The oscillating sucker in cooperation with the air blast 80, as more fully described in discussion of FIGS. 2A–2D, removes the closest paper from the stack 16 and the paper is fed between guides 76 and 77 fixed to the frame, into contact with the vacuum wheel 41. As the paper is transported on the wheel 41 it is read by the reader 42 with the assistance of the lights 42A, 42B.

The reader 42 may be a photoelectric device or may be sensitive to infra red or magnetic indications. The details of the coding of the papers and the pickup are outside the scope of the present invention and various conventional coding methods and pickups may be used. Alternatively, the automatic reader may be dispensed with and the papers read visually by an operator who can operate a manual keyboard 38, FIG. 8, for controlling the operation of the present invention.

The paper are then transferred to the vacuum wheels 43 and 44. All of the transfer wheels are synchronously driven by a series of gears mounted behind the front panel and designated by numbers corresponding to the numbers of the wheels with the suffix G as illustrated in FIG. 1A. All of the transfer wheels have vacuum controlled ports and each contains a valve for controlling the vacuum, as will be more fully described in connection with FIG. 4. In certain wheels, where the action is not varied, the valve is turned on and off by fixed cams mounted on the frame. For instance, wheels 43 and 44 pick up and deposit papers on each cycle. Therefore on wheels 43 and 44 the vacuum is always turned on as the valve port approaches the point of tangency with the preceding wheel and the vacuum valve is always turned off as the wheel port approaches the point of tangency with the succeeding wheel port.

The wheels have a tangent relationship but there is a space between them larger than the thickness of a paper so that the paper is transferred by means of the vacuum control. Therefore, if one of the papers falls off the machine it will merely fall to the ground or table and it will not be damaged by any gears or mechanical picks or fingers. This feature is rather important in the processing of original documents such as checks since damage to these documents cannot be tolerated under any conditions.

All of the papers are transferred to the wheel 1. Now, if a paper is to be deposited in the pocket 1A then a signal is supplied from the reader 42 or keyboard 38, via the memory wheel which will be discussed in connection with FIGS. 6 and 6A, to a solenoid which operates the movable cam 55 on the wheel 1, FIG. 4. In its normal position the cam 55 will turn off the vacuum so that the paper will normally be transmitted to the next wheel T. However if a signal is received, the cam 55 is retracted so that the vacuum remains on, and the paper remains on the wheel 1 until it is deposited in the pocket 1A. Note that the wheel 1 also has two fixed cams indicated by the arcs labelled "on" and "off." The "on" cam 53 always turns the vacuum on to receive the paper from the wheel 44 and the "off" cam 54 always turns the vacuum off in order to deposit the paper in the pocket. If the paper is not to be deposited in the pocket 1A the vacuum would be already turned off by the movable cam 55 before the valve reaches the fixed "off" cam.

If the paper is not to be deposited in the pocket 1A it is then transferred to the wheel T. If the paper is to be deposited in one of the remaining pockets on the lower level no signal is supplied to the wheels T or 1 and the paper will be automatically transferred to the wheel 2. Then the paper is transferred to the wheel T2 and then to the wheel 3, etc. If no signal at all is supplied the paper will be deposited in the reject pocket RA.

If the paper is to be deposited in one of the pockets on the upper level then a signal must be supplied to the wheel T, which signal actuates the movable cam TC which retains the vacuum on wheel T so that the paper is transferred to the wheel U and then to the wheel T7 and then to the wheel 7. If the paper is to be deposited in the pocket 7A a signal must be supplied to the movable cam 7C in the same manner as previously discussed. All of the wheels 7, 8, 9 and 10 have movable cams 7C, 8C, 9C, 10C but the wheel 11 does not have a movable cam as it is the last wheel. In other words, to deposit a paper in pocket 11A requires only a signal to the wheel T.

If no signal at all is given or if the desired wheel does not positively retain a paper it is automatically deposited in the reject pocket RA, or pocket 11A if the paper is on the upper level. Note that a positive action is required to put a paper in any other pocket. Therefore a particular malfunction would not misplace a paper. Centrifugal force on valves tends to turn the vacuum off which is consistent with above. However each valve has two stop pins like 90, 91 (FIG. 3).

FIG. 1A shows a top view of the embodiment of FIG. 1. All of the vacuum wheels 44, 1, T, U, etc. are mounted on one side of the frame F and corresponding gears 44G, 1G, TG, etc. are mounted on the other side on the corresponding shafts of their associated vacuum wheels, which shafts are journalled to the frame. The gears mesh together in the same relation as the wheels shown in FIG. 1.

All power is supplied by means of the motor driven chain 40 which is connected to sprocket TZ mounted on the shaft of the wheel T and its associated gear TG. All of the rotational power to the wheels is supplied through the chain 40, the gear TG and the connecting chain of gears to all of the wheels shown in FIG. 1. Vacuum is supplied to all of the vacuum wheels from the vacuum pipe 39 which is connected through pipe connections and hollow channels in the gear and wheel shafts to supply vacuum to all of the vacuum wheels.

Figure 2A:
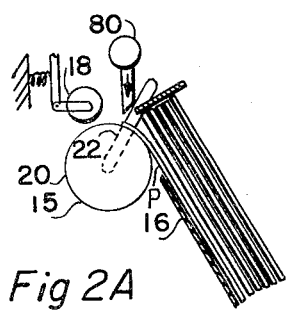
FIGS. 2A, 2B and 2C are diagrams illustrating the operation of the invention.
Figure 2B:
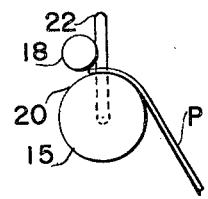
Figure 2C:
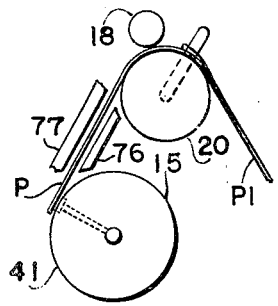
Figure 5A:
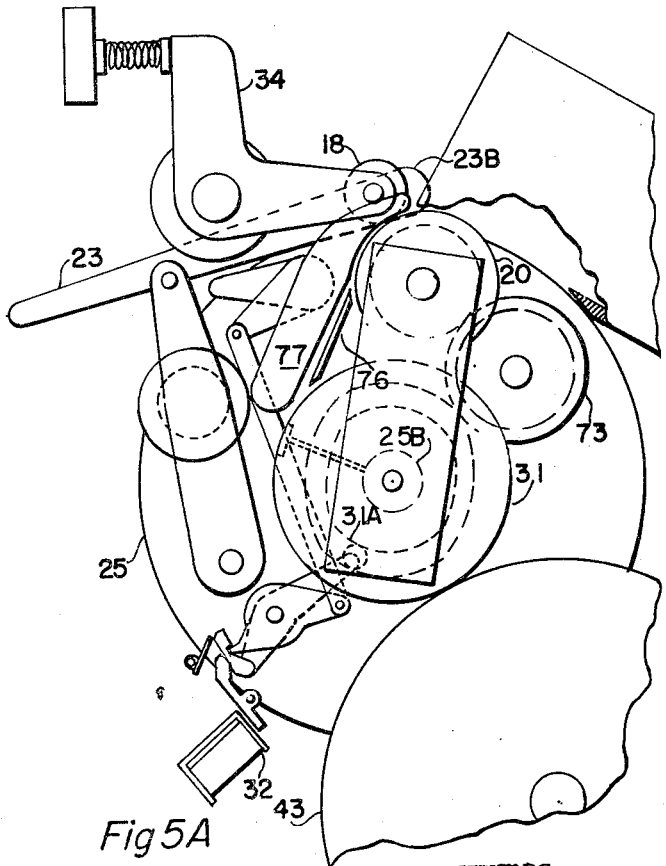

FIGS. 2A through 2C show the operation of the paper feeding means. The papers are held in a rack 16. The closest paper P is attracted to the vacuum sucker 20 because of its vacuum. The sucker 20 is adapted to be oscillated a short distance by the member 22.

FIG. 2A shows the member 22 in its rightward position and the paper P having been attracted around the sucker 20 by means of the vacuum.

Figure 5B:
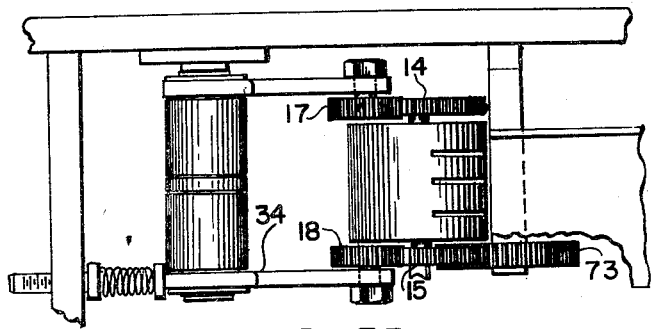
FIGS. 5A and 5B are top and side views illustrating the paper feeding means.
Figure 5:
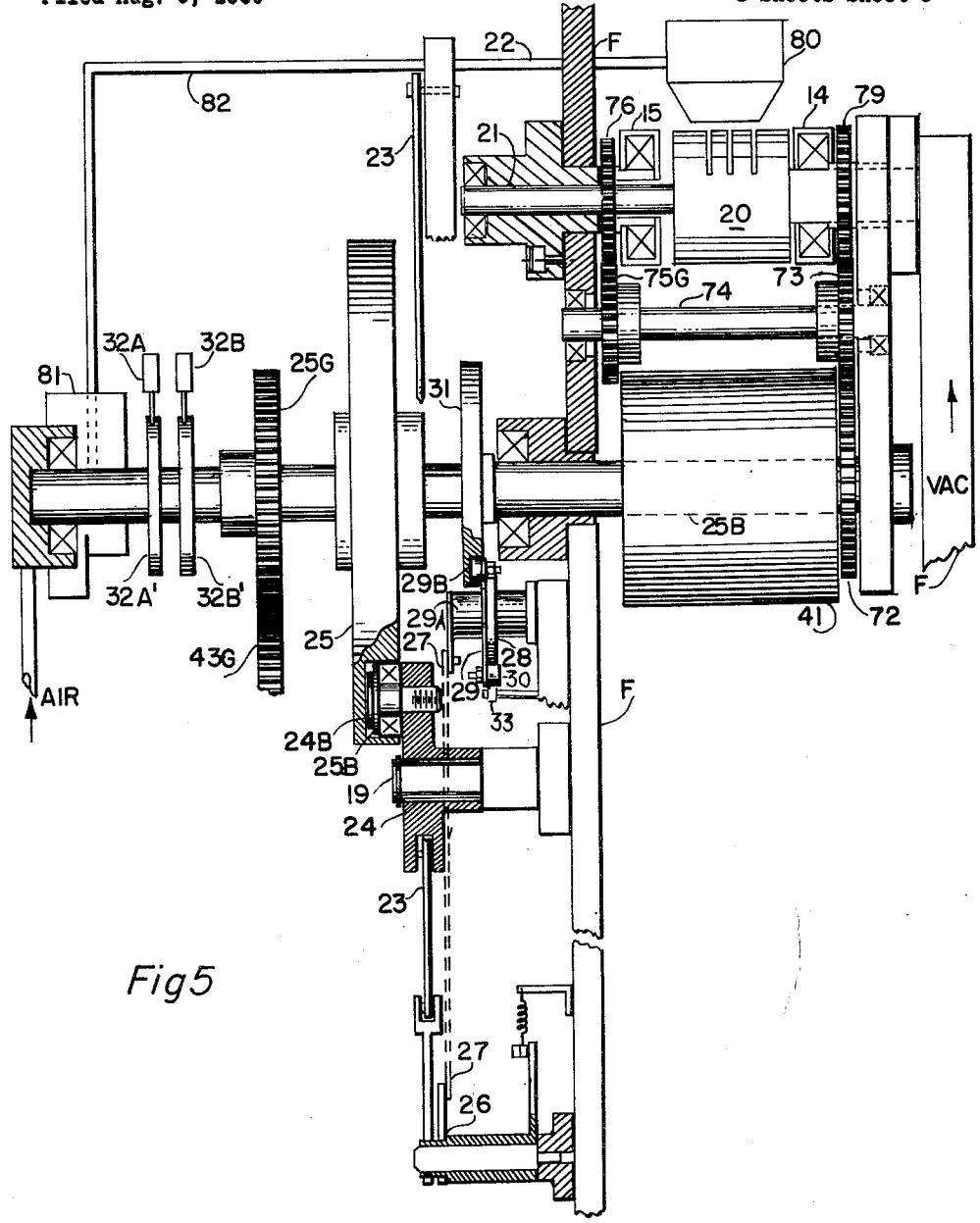
FIG. 5 is a top view of FIG. 2 illustrating the paper feeding means, partially developed to show detail.

The paper P is assisted in separating from the stack by stationary air blast means 80 which is connected by hose 82 to valve 81 (FIG. 5). The air blast is turned on during phase shown in FIG. 2A.

In FIG. 2B the sucker 20 is moving to the left a sufficient distance to engage the leading edge of the paper between the driven rollers 14 and 15 (FIG. 5B) mounted on either side of the sucker and the spring loaded rollers 17 and 18 mounted on the bracket 34. The rollers 14 and 15 are driven in one direction by means of the driven gears 72, 73, idler shaft 74 and gear 75.

FIG. 2C shows the paper being driven down by means of the driven rollers 14 and 15 between the guides 76, 77 on frame F into contact with the vacuum wheel 41. A second paper P1 is attracted to the sucker in overlapping relation to the first paper, thereby continuously sealing the vacuum in the sucker which is not valved.

The paper feeder mechanism is driven via gears 43G and 41G on shaft 25B which drives cam 25.

Paper drive roller 14 (FIG. 5) is driven by gears 43G, shaft 25B, gears 72, 73 on idler shaft 74, and gear 79 on roller 14. Paper drive roller 15 is driven from idler shaft 74 by gears 75 and 76 on roller 15. Rollers 14 and 15 (FIG. 5) mounted on either side of sucker 20 are driven in one direction. Pressure rollers 17 and 18 on arm 16 bear against rollers 14 and 15.

Referring to FIGS. 2, 5, 5A and 5B the sucker 20 is oscillated by shaft 21 and connected to member 22. Member 22 is pivotally connected to the bar 23 at pivot 23B, bar 23 having a notch 23'. The other end of the member 23 is spring loaded down by means of the spring 23A. The bar 23 has both a pivotal movement about the point 23B on member 22 and also a sliding movement along its long axis as will be described. Member 22 is spring loaded by spring 22A.

The bar 23 is adapted to be oscillated along its axis by means of the member 24, which is pivotally mounted to the frame on the shaft 19 and contains a pin 24A which is adapted to engage the notch 23' of bar 23. The other end of the member 24 contains a cam follower 24B which rides in a groove 25A of the cam 25 on the shaft 25B, which is driven by gears 43G and 25G (FIG. 5). The groove 25A is a two rise cam. It may be modified in conventional manner to vary the motion. Bar 23 is normally disengaged being raised by spring 26A on crank arm 26. Cam 25 rotates once per large cycle. The sucker 20 feeds a paper every rotation, if micro switch 32B is energized, or twice each rotation of cam 25, if micro switch 32A is energized. An interpose means is provided to give large and small paper cycles and in order to interrupt or terminate the flow of papers at the sucker and still process the papers in transit. The bar 23 may be lowered and engaged to pin 24A by means of the linkage comprising the crank arm 26, link member 27 and arm 28. This arrangement preserves the overlapping paper seal on the sucker vacuum, so that it is ready for immediate operation. If the vacuum was cut off there would be slow starting as the vacuum system must be primed after being unsealed. The arm 28 and the arm 29 are pivoted on the same shaft 29A and they are adapted to be locked together by means of the pawl 30 mounted on the arm 29 which is adapted to engage the tooth on the arm 28. On the other end of the arm 29 is a cam follower 29B which rides the two rise groove 31A of cam 31, on shaft 29B.

The pawl 30 lock is actuated by means of the solenoid 32 which pivots the armature 33 into sliding contact with the pawl 30. Therefore, when the solenoid 32 is energized by switch 32A or 32B (FIGS. 5, 8), the pawl lock is completed and the linkage including the member 27 and crank arm 26 lowers the bar 23 so that there will be axial movement of the bar 23, and sucker 20 will be oscillated. The solenoid 32 is actuated by micro switches 32A and 32B, operated by one rise cam 32A or two rise cam 32B' for small papers.

This demand control or interpose feature of the paper feeder is necessary to change cycles and where it is desired to stop the flow of papers immediately without stopping the entire machine. This feature is quite useful for instance where it is desired to process a predetermined number of papers or for stopping the flow of papers in an emergency, since the flow of papers cannot be stopped immediately by stopping the heavy components of the machine as they have a large amount of inertia. Also it permits papers in process to be deposited in the proper pockets.

Figure 4:
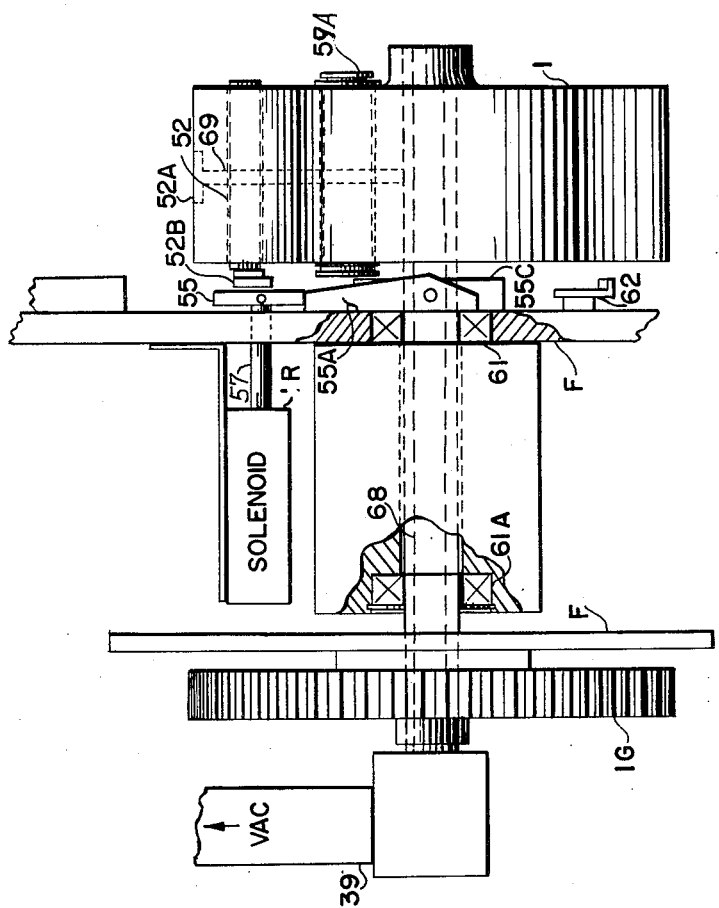
FIG. 4 is a side detail view showing the cam control means on the wheels.

FIGS. 3 and 4 show the details of the transfer wheels and the vacuum control valve means. Referring to the wheel 44 vacuum is supplied through the center shaft 44A and the radial channel 45 to the port 46 through the valve 48. There are up to four sets of ports on the large wheels for four small documents. To handle two large documents two sets of ports are blocked off by valves 59, 59A. The valve comprises a shaft member 48 which is rotatably mounted in a corresponding shaftway in the wheel 44, the shaft 48 having a channel 48A which connects with the channel 45 when the valve is in the "on" position, shown. Connected to the shaft 48 is a control wing member 49 which is actuated by the fixed cam member 50 to put the valve 47 in the "on" position as the port 46 approaches the point of tangency with the wheel 43. In the wheel 44 the valves are always turned on by the cam 50 as all papers are picked up by the wheel 43. Similarly the valve 47 is always turned off by the fixed cam 51, mounted on the frame, since all papers are transferred to the wheel 1.

The wheel 1 has a similar valve 52 which is always turned on by the fixed cam 53 as the port 52A approaches the point of tangency with the wheel 44.

In addition the valve 52 is always turned off by the fixed cam 54 since if it is carrying a paper at that point it is desired to cut off the vacuum to deposit the paper in the pocket 1A.

In addition to the fixed cams there are movable cams where it is desired to make a decision. For instance all papers are processed by the wheel 1. If it is decided to deposit the paper in the pocket 1A then the movable cam 55 (FIG. 4) is lifted so that it will not contact the valve 52. Therefore, the paper will be retained by the wheel 1 and deposited in the pocket 1A. If no signal is given to the wheel 1 and cam 55 then the cam 55 will be in its normal position which will turn off valve 52 and cut off the vacuum just before the paper reaches the point of tangency with the next wheel T.

The movable cam 55 is mounted on a pair of arms 55A and 55B which are pivotally mounted on the ring 55C of the wheel 1. A solenoid 1R is connected to the cam 55 by means of the member 57 for the purpose of moving the cam as will be further discussed.

Referring to FIG. 1 all of the wheels have similar valve arrangements. Only the pocket wheels and wheel T have movable cams except the end pocket wheels 11 and R do not have movable cams.

Certain wheels always transfer the paper and have only fixed cams, for instance wheels 43, 44, R and T2 through T11.

The wheel T and the pocket wheels 1 through 10 receive signals on solenoids TR and 1R-10R which operate movable cams like cam 55 on wheel 1. The other movable cams are designated by the suffix C. These wheels also have fixed cams.

Typical pocket 1A (FIG. 3) comprises a bent strip member 90 mounted on bracket 91 which is pivotally mounted to frame F and spring loaded up by compression spring 92. The end of strip 90 nests in catcher member 94 so that papers on wheel 1 are caught under catcher 94 and held therein by spring loaded member 90. An overload switch may be added to bracket 94 and actuated by member 90 when the pocket is full.

FIG. 4 shows a detail side view of the vacuum control valve means on a typical vacuum wheel 1 as also shown in FIG. 3. The wheel 1 is rotatably mounted in the frame F by means of the bearings 61, 61A. The valve 52 has a wing member 52B which is adapted to be rotated by means of the control cams 62 and 55. The control cam 62 is a typical fixed cam shown for illustration which is fixedly mounted on the frame F. The fixed cams such as cams 53 and 54 on FIG. 3 but not on FIG. 4 actuate the valve on each rotation of the vacuum wheel. Valves 59, 59a block off two sets of ports when large papers are being handled.

A movable cam 55 is mounted on arms 55A and 55B which are pivotally mounted on the ring member 55C. The arms 55A and 55B are adapted to be moved by means of the solenoid 1R. All of the movable cams 2C, 3C etc. are identical and are arranged to normally turn the vacuum off. However, when it is desired to place the paper in the pocket associated with a particular wheel, for instance wheel 1, the solenoid 1R connected to the movable cam on that wheel actuates the cam out of contact with the valve member 52B so that the vacuum remains on and the paper is not transferred to the next wheel T but is placed in the pocket 1A. The vacuum is supplied to the wheel 1 from the vacuum pipe 39 through the hollow shaft 68 to the radial channel 69 in the wheel 1 and via valve 52 to the vacuum port 52A.

Figure 6A:
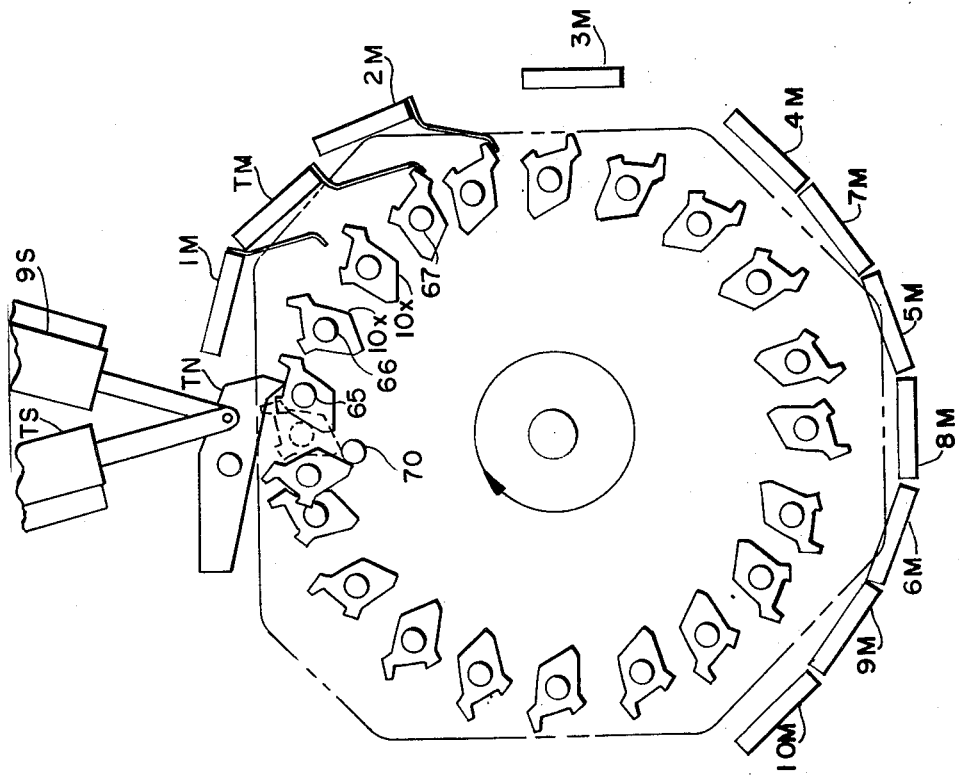
FIG. 6A is a front view of the memory control means.
Figure 6:
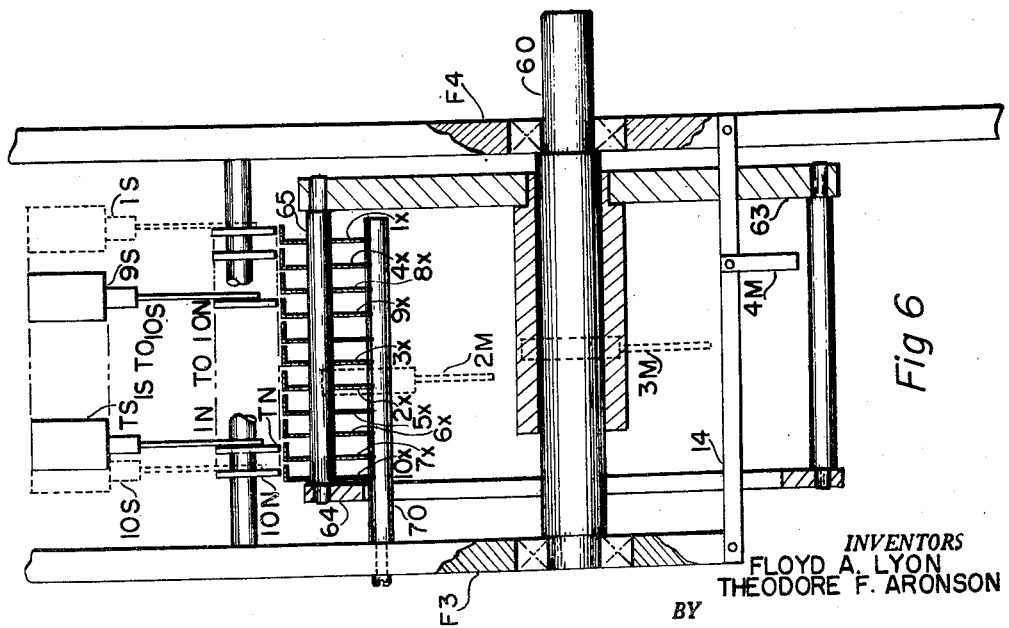
FIG. 6 is a side view of the memory and control means.

FIGS. 6 and 6A show the memory wheel which is mounted on a main shaft 60 connected to stationary frame members F3 and F4. The shaft 60 is connected in synchronized relation to the transfer wheels. For large papers the shaft 60 rotates once for each 10 long cycles in FIG. 7. The wheel comprises disc 63 and ring 64 upon which are mounted a series of shafts 65, 66, 67, etc. around the outer periphery of the disc 63 and ring 64. Each shaft 65, etc. has a series of pawl members 1X to 10X inclusive and one labeled TX, which are operated by solenoids 1S to 10S and TS of which only TS and 9S are shown in FIG. 6A. Each one of these solenoids is actuated when the correspondingly numbered or lettered wheel is desired to be signaled. The shafts 65, 66, 67, etc. are twenty in number and are spaced at intervals of 18° around the membery wheel. Micro switches TM, 1M, 2M, 3M etc. are mounted on brackets on frames F3, F4 around the periphery of the discs 63 and 64 and these micro switches are adapted to be actuated by the pawl members 1X, 2X, TX, etc. as the memory wheel rotates. The memory wheel rotates clockwise in the showing of FIG. 6A and all of the pawl members 1X, 2X, etc. are reset to a neutral position as they pass the reset bar 70. Particular members 1X, 2X, etc. are set by means of the solenoids 1S, 2S, etc. which operate the pawl teeth 1N, 2N, etc.

The signals are sent by the reader 42 at the time the paper is read. The papers are coded for instance with a grid of dots, the reader being responsive to the dot pattern. The coding and reader are outside the scope of the present invention and may be conventional, the reader herein being considered merely a source of signals. Photoelectric character readers and magnetic ink code readers are conventionally used. Alternatively a manual keyboard (FIG. 8) may be used.

For instance, if it is desired to send a signal to the wheel 7 then the solenoid 7S will actuate member 7X as it contacts the actuated tooth 7N. Now, when that pawl member 7X is rotated around into contact with the micro switch 7M then a signal will be supplied via solenoid 7R to the wheel 7 to place that paper in the pocket 7A. The travel of the memory wheel from the top point of actuation to the micro switch 7 corresponds to the time for that particular paper to travel from the reader to the wheel 7 and as many as twenty papers may be handled at the same time.

FIG. 8 shows a schematic circuit diagram for controlling the various valves on the wheels in a predetermined manner. The documents are read by the reader device 42. The documents preferably have a code, for instance of patterns of dots which may be read by photoelectric means in the reader control means 42. The reader control means is adapted to read the document to determine which pocket it should be placed in and to provide a signal to the proper solenoid to actuate the proper pawl on the memory wheel. For instance, if it is desired to place a document in the pocket 3 then the pawl 3X would be actuated by the solenoid 3S, and as the memory wheel rotates around, the pawl 3X would energize the micro switch 3M to send a signal to the solenoid 3R which would actuate the valve in the wheel 3 to retain the document and place it in the pocket 3A.

The details of the reader apparatus are outside the scope of the present invention and may be conventional. Alternatively the document may be manually read and the operator presses the proper button on the keyboard 38 to provide a signal via switch 72 to the proper pawl solenoid.

If the desired pocket is on the upper level the wheel T must also be energized and a separate key is provided for this. This control to the wheel T could be automatically incorporated in the switching apparatus when any of the keys 7 through 10 are energized.

Switches 32A and 32B may control solenoid 32 directly to operate pawl 30 to energize the paper feed. Switch 32A is operated by single rise cam 32A' on shaft 25B, FIG. 5, to engage the pawl 30 every large cycle of FIG. 7 for large papers. Switch 32B is operated by double rise cam 32B' on shaft 25B to engage the pawl for every small cycle of FIG. 7. Cam 25 rotates once per large cycle.

Control switching may be added, for instance, the apparatus may also be shut off with an anti-jamming micro switch mounted above the sucker. Also, limit switches may be placed on the pockets to cut off the apparatus when a predetermined number of papers are in any pocket to prevent spilling of the papers. Counting or time devices may be incorporated.

FIG. 7 shows a timing diagram for the operation of the apparatus. The diagram shows ten cycles for large papers and twenty cycles for small papers. In order to handle twice as many papers in the same time an extra pair of ports and valves would have to be added 180° displaced from the first pair of ports and valves on each wheel.

The line 83 shows the leading edge of the paper in the first cycle. The line 84 shows the trailing edge of the first paper if it is a small paper and line 85 shows the trailing edge of the first paper if it is a large paper. The line 86 shows the time of feeding the first paper from the stack and the line 87 shows the cam return. Line 88 shows the time when interpose engages. Line 89 shows feed by bar 23 and line 89' shows cam return. The blocks 95, 96, etc. show the spacing time for small papers and the blocks 97, 98 show the spacing time for large papers. The block 99 shows the time during which the signal is supplied from the reader to the memory device for the first paper and the blocks 100, 101, 102 show the times during which the signals would be transmitted from the memory to the wheels 1T and 2 respectively. The bracket 103 shows the reading time for large papers and bracket 104 shows the reading time for small papers. The second large paper would be transmitted during the second long cycle and the second small paper would be transmitted during the second small cycle. Therefore, ten large papers or twenty small papers could be in process at the same time.

Many modifications may be made by those who desire to practice the invention without departing from the scope thereof which is defined by the following claims.

We claim:
1. Paper feeding means comprising a rack for holding a stack of papers, an oscillatable sucker mounted in contact with said stack, a source of vacuum connected to said sucker, means to oscillate said sucker comprising a first member, means to said sucker, a second member pivotally connected to said first member, said second member having a notch thereon, an oscillatable driven arm adapted to engage said notch, and means to raise said second member to disengage said arm from said notch to stop oscillation of said sucker.

2. Apparatus as in claim 1 wherein said last means comprises a crank arm adapted to raise said second member, a link member connected to said crank arm at one end, a first arm pivotally mounted and connected to said link, a second arm pivotally mounted in the same axis as said first arm, a pawl mounted on said second arm and adapted to contact said first and solenoid means adapted to actuate said pawl.

3. Paper feeding means comprising a rack for holding a stack of papers, an oscillatable sucker adjacent said stack, said sucker having a curved surface with vacuum ports in contact with the closest paper in said rack, and means to remove said papers from said sucker so that as the trailing end of a paper passes over said sucker the next paper is sucked down in overlapping relation, a source of vacuum continuously connected to said sucker, means to oscillate said sucker, to remove papers from said stack in overlapping relation, means to take papers away from said sucker, and means to quickly stop and start said feeding of papers without affecting said continuous vacuum supply to said sucker and without unsealing said sucker comprising means to disconnect said means to oscillate said sucker.

4. Paper sorting means comprising a rack for holding a stack of papers to be sorted; a plurality of receiving pockets for said papers; means to simultaneously transfer a plurality of papers to predetermined ones of said pockets; paper feeder means adjacent said rack connected to remove papers from said rack comprising a vacuum sucker, means to oscillate said sucker to partially remove papers from said rack; takeaway means to remove papers from said sucker; a first vacuum wheel located and adapted to receive papers from said takeaway means, reading means adjacent said first vacuum wheel to read information on papers on said first vacuum wheel, a plurality of vacuum wheels having tangential series relation to each other and to said first vacuum wheel, valve means to control transfer of said papers between said plurality of vacuum wheels and memory means connected to said reader and connected to control said valve means.

5. Apparatus as in claim 4 wherein said control means are arranged so that a positive control is required to place a paper in a predetermined pocket, and upon the failure of said positive control said paper is deposited in a reject pocket.

6. Apparatus as in claim 4 wherein said vacuum control wheels are arranged in series with tangential relation but spaced a distance from each adjacent wheel greater than the thickness of a paper whereby said papers are held only by vacuum pressure so that if one of said papers falls it will not be damaged by being cut or jammed by said wheels.

7. Apparatus as in claim 4 wherein said valve control means comprises stationary cams and movable cams operating said control valves, said movable cams being remotely controlled.

References Cited in the file of this patent
UNITED STATES PATENTS

| | | |
|---|---|---|
| 1,853,781 | Rider | Apr. 12, 1932 |
| 2,132,447 | Stout | Oct. 11, 1938 |
| 2,312,357 | Odquist | Mar. 2, 1943 |
| 2,620,924 | Kusters | Dec. 9, 1952 |
| 2,686,052 | Winkler | Aug. 10, 1954 |
| 2,804,974 | Noon | Sept. 3, 1957 |
| 2,905,466 | Azari | Sept. 22, 1959 |
| 2,965,291 | Hayes | Dec. 20, 1960 |
| 2,988,215 | Nelson | June 13, 1961 |